United States Patent
Ahn et al.

(10) Patent No.: US 7,840,972 B2
(45) Date of Patent: Nov. 23, 2010

(54) OPTICAL DISC DEVICE AND METHOD OF CONTROLLING THE SAME

(75) Inventors: Cheol-woong Ahn, Seoul (KR); Jae-hyun Yoon, Suwon-si (KR); Un-jin Choi, Suwon-si (KR); Jeong-hun Yeom, Seongnam-si (KR); Myong-chun Lee, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 948 days.

(21) Appl. No.: 11/702,507

(22) Filed: Feb. 6, 2007

(65) Prior Publication Data
US 2007/0192776 A1   Aug. 16, 2007

(30) Foreign Application Priority Data
Feb. 16, 2006   (KR) ...................... 10-2006-0015245
Jan. 11, 2007   (KR) ...................... 10-2007-0003409

(51) Int. Cl.
*G11B 17/04* (2006.01)
(52) U.S. Cl. .................................................... 720/623
(58) Field of Classification Search ................. 720/623, 720/626, 707, 711, 646, 624, 621
See application file for complete search history.

(56) References Cited

U.S. PATENT DOCUMENTS

| | | | |
|---|---|---|---|
| 4,682,320 A | 7/1987 | d'Alayer de Costemore d'Arc | |
| 4,979,160 A | 12/1990 | Araki | |
| 5,022,023 A * | 6/1991 | Toyoguchi | 720/624 |

FOREIGN PATENT DOCUMENTS

| | | |
|---|---|---|
| EP | 1 378 901 | 1/2004 |
| JP | 11-203761 | 7/1999 |
| JP | 11-328799 | 11/1999 |
| JP | 2004-246970 | 9/2004 |
| KR | 2003-70434 | 8/2003 |
| KR | 2003-77115 | 10/2003 |
| KR | 2005-110811 | 11/2005 |
| TW | M270457 | 7/2005 |

OTHER PUBLICATIONS

Extended European Search Report issued Dec. 5, 2008 in corresponding European Patent Application No. 07102561.3.
Chinese Office Action issued on Mar. 23, 2010, in corresponding Chinese Application No. 200710100683.8 (9 pages).
Taiwanese Office Action issued on Jul. 23, 2010, in corresponding Taiwanese Application No. 096106065 (4 pages).

* cited by examiner

*Primary Examiner*—Allen T Cao
(74) *Attorney, Agent, or Firm*—NSIP Law

(57) ABSTRACT

The optical disc device includes a main unit rotating a turntable when a disc is coupled to the turntable and including an optical pick-up unit writing/reading data to/from the disc; a lever member guiding the disc to load the disc to a position at which a center of the disc is aligned with a center of the turntable and reversely guiding the disc to unload the disc, the lever member being capable of loading/unloading discs having various diameters; and a driving unit actuating the lever member. The method of controlling the optical disc device includes detecting a diameter of a disc; loading the disc to a position at which a center of the disc is aligned with the center of the turntable; coupling the disc to the turntable; and moving the lever member away from the disc to allow writing/reading data to/from the disc to be performed.

40 Claims, 14 Drawing Sheets

OPTICAL DISC DEVICE AND METHOD OF CONTROLLING THE SAME

CROSS-REFERENCE TO RELATED APPLICATIONS

This application claims the benefit of Korean Patent Application No. 10-2006-0015245, filed on Feb. 16, 2006, and Korean Patent Application No. 10-2007-0003409, filed on Jan. 11, 2007, in the Korean Intellectual Property Office, the disclosures of which are incorporated herein in their entirety by reference.

BACKGROUND OF THE INVENTION

1. Field of the Invention

The present invention relates to an optical disc device and a method of controlling the optical disc device, and more particularly, to an optical disc device having a slot for receiving/removing an optical disc and a method of controlling the optical disc device.

2. Description of the Related Art

Examples of data storage mediums include magnetic discs such as floppy discs and hard discs, magnetic tapes, semiconductor memory chips such as read-only memory (ROM) and random-access memory (RAM), and optical discs.

The use of optical discs (hereinafter, also referred to as "discs") is dramatically increasing owing to the development of high-capacity and inexpensive optical discs. Optical discs can be classified into two types depending on capacity: compact discs (CDs) and digital versatile discs (DVDs). Data recording, deleting, and reproducing are possible using discs such as 650 MB CD-R, CD-RW, 4.7 GB DVD-R, DVD+R, DVD-RW, and DVD+RW. Furthermore, HD-DVDs and blue-ray discs having a 20-GB capacity or higher are being developed.

Optical discs can be used as data storage mediums for portable electric apparatuses such as notebook computers and camcorders. However, conventional optical disc devices using optical discs are not suitable for portable electric apparatuses since the optical disc devices are too large and thick for use in portable electric apparatuses. Although slim optical disc devices can be used for the portable electric apparatuses, it is inconvenient to insert/remove a disc into/from the slim optical disc device. In a tray type optical disc device, a disc is placed on a tray or cassette and then is loaded in the optical disc device. However, in a slot-in type optical disc device, a disc can be automatically inserted/removed into/from the slot-in type optical disc device through a slot formed in a side of the slot-in optical disc device. The slot-in type optical disc device may be more suitable for a portable electric apparatus than the tray type optical disc device.

Meanwhile, the slot-in type optical disc device can be used with only an optical disc having a diameter of about 12 cm (hereinafter, referred to as a "large-diameter disc"). However, as the development of high-density discs continues, the use of optical discs having a diameter of about 8 cm (hereinafter, referred to as a "small-diameter disc") is increasing, and thus there is an increasing need for a slot-in type optical disc device that can be used with a small-diameter disc. Furthermore, the standard size of the large-diameter disc or the small-diameter disc can be changed. Moreover, there can be an upper limit to the thickness of an optical disc device used for a portable electric apparatus such as a notebook computer. Although the upper limit is currently about 12.7 mm, it can be changed. Therefore, there is a need for a slot-in type optical disc device that can be used with both a large-diameter disc and a small-diameter disc and has a thickness smaller than the upper limit. Furthermore, although the structure of the slot-in type optical disc device for loading and coupling a disc should be compact, the slot-in type optical disc device should not be excessively small and light so as to prevent the slot-in type optical disc device from being easily damaged by vibrations and impacts and to prevent data reading/writing errors.

Therefore, what is needed is a slot-in type optical disc device that has a thickness smaller than the upper thickness limit, requires fewer components, can be used with optical discs having various diameters (e.g., a large-diameter disc and a small-diameter disc), and can be stably protected from vibrations and impacts.

SUMMARY OF THE INVENTION

Additional aspects and/or advantages of the invention will be set forth in part in the description which follows and, in part, will be apparent from the description, or may be learned by practice of the invention.

The present invention provides an optical disc device having a compact structure requiring fewer components and a method of controlling the optical device. The optical disc device can be stably protected from vibrations and impacts, and discs having various diameters can be automatically inserted into and removed from the optical disc device by an automatic slot-in method. Furthermore, the thickness of the optical disc device can be reduced below a current thickness limit.

According to an aspect of the present invention, there is provided an optical disc device including: a main unit rotating a turntable when a disc is coupled to the turntable and including an optical pick-up unit writing/reading data to/from the disc; a lever member guiding the disc to load the disc to a position at which a center of the disc is aligned with a center of the turntable and reversely guiding the disc to unload the disc; and a driving unit actuating the lever member, wherein the lever member moves along a different path according to a diameter of the disc so that the lever member is capable of loading/unloading discs having various diameters.

The lever member may include: an eject lever applying an elastic force to the disc in an unloading direction of the disc; a guide lever including a disc guide surface extending straight in a loading direction of the disc; and a loading lever pushing the disc in a predetermined direction to load the disc and moving in a direction opposite to the predetermined direction when the disc is unloaded.

The guide lever may have a four-bar structure and moves substantially in parallel with the loading direction of the disc when the guide lever moves.

The optical disc device may further include a locking unit locking the guide lever and the loading lever in a standby mode. The locking unit may unlock the guide lever and the loading lever when both the guide lever and the loading lever are pushed by a disc manually inserted through a slot of the optical disc device.

The locking unit may include: a first link including a first cam connected to a first boss formed on the guide lever and rotating about a first hinge by a movement of the first cam; and a second link including a second cam connected to a second boss formed on the loading lever and rotating about a second hinge by a movement of the second cam.

An end of the first link, opposite to the end where the first cam is formed, may be pivotably coupled to an end of the second link opposite to the end where the second cam is formed.

The first link may include a first locking portion at an inflection section thereof, and the second link may include a second locking portion at an inflection section thereof, wherein the first locking portion locks the guide lever by confining the first boss thereto, and the second locking portion locks the loading lever by confining the second boss thereto.

When the first and second links are rotated in opposite directions due to a disc being manually inserted into the optical disc device, an extent of each inflection of the first and second locking portions may be diminished such that the guide lever and the loading lever are unlocked.

The first link may include a first loading portion, and the second link may include a second loading portion, wherein when a large-diameter disc is loaded/unloaded, the first and second bosses move respectively along the first and second loading portions, and when a small-diameter disc is loaded/unloaded, the first boss is locked in the first locking portion and the second boss moves along the second loading portion.

The driving unit may include: a driving source; and a main slider including a rack connected to the driving source, the main slider actuating the lever member while moving straightly.

The main slider may further include: a first loading cam actuating the loading lever so as to move a large-diameter disc; and a second loading cam actuating the loading lever so as to move a small-diameter disc.

One of the first and second loading cams may be selected by a variation of the amount of movement of the loading lever according to a diameter of a disc manually inserted through a slot of the optical disc device.

The loading lever may include a loading cam boss engaging with one of the first and second loading cams according to a diameter of the disc manually inserted through the slot of the optical disc device.

The first and second loading cams may move the loading lever away from a disc after the disc is coupled with the turntable.

The driving unit may further include a sub slider reciprocating in connection with the main slider for the sub slider to move in a reciprocating motion, the sub slider including a guide lever separator moving the guide lever away from the disc after the disc is coupled to the turntable and an eject lever separator moving the eject lever away from the disc after disc is coupled to the turntable.

The guide lever separator may include a first and second guide lever separators moving the guide lever away from the disc to different positions according to a diameter of the disc, and the eject lever separator may include a first and second eject lever separators moving the eject lever away from the disc according to the diameter of the disc.

One of the first and second guide lever separators may be selected to move the guide lever away from the disc by the variation of the amount of movement of the guide lever according to a diameter of a disc manually inserted through a slot of the optical disc device.

One of the first and second eject lever separators may be selected to move the eject lever away from the disc by the variation of the amount of movement of the eject lever according to a diameter of a disc manually inserted through a slot of the optical disc device.

The sub slider may further include a guide lever regulating portion that regulates movement of the guide lever when a small-diameter disc is loaded so as to push the guide lever against the small-diameter disc.

The sub slider further may include a coupling/decoupling guide that guides the main unit when the main unit is lifted for coupling with the disc and moved down for decoupling from the disc.

The driving unit may further include a guide lever regulating link regulating movement of the guide lever when a large-diameter disc is loaded so as to push the guide lever against an edge of the large-diameter disc, the guide lever regulating link being rotated by the sub slider to release the guide lever after the large-diameter disc is coupled to the turntable.

The driving unit may further include a connection link connecting the main slider and the sub slider.

The main slider may further include a connection link cam actuating the connection link.

The loading lever may include: a first loading lever including an end connected to the main slider and capable of rotating about a first loading lever hinge; and a second loading lever capable of rotating about a second loading lever hinge, the second loading lever including one end pivotably connect to the first loading lever and the other end making contact with an edge of a disc inserted into the optical disc device.

The optical disc device may further include a shutter closing a slot of the optical disc device after a disc is loaded in the optical disc device.

The shutter may be actuated by the main slider.

The guide lever and the loading lever may be elastically biased toward the disc.

The optical disc device may further include a diameter detector detecting a diameter of a disc inserted through a slot of the optical disc device.

The diameter detector may include a guide lever switch detecting a large-diameter disc, wherein when the guide lever switch is pressed by the guide lever during loading of a disc, the disc is determined as a large-diameter disc.

The driving unit may include a driving switch used for turning on/off the driving unit, wherein when a disc is manually inserted through a slot of the optical disc device to a predetermined position, the driving switch is turned on and the driving unit starts to operate, and when the disc is moved away from the predetermined position while being unloaded, the driving switch is turned off to stop the driving unit and the disc is unloaded by an elastic force of the eject lever.

When a large-diameter disc is loaded/unloaded, the guide lever, the eject lever, and the loading lever may be simultaneously moved, and when a small-diameter disc is loaded/unloaded, the guide lever may be locked, and the eject lever and the loading lever may be moved.

A distance between the guide lever and the loading lever measured adjacent to a slot of the optical disc device in a standby mode may be larger than a diameter of the small-diameter disc and smaller than a diameter of the large-diameter disc.

The optical disc device may have a thickness less than or equal to 12.7 mm.

According to another aspect of the present invention, there is provided a method of controlling an optical disc device, the optical disc device including: a main unit rotating a turntable when a disc is coupled to the turntable and including an optical pick-up unit writing/reading data to/from the disc; a lever member guiding the disc to load the disc to a position at which a center of the disc is aligned with a center of the turntable and reversely guiding the disc to unload the disc, the lever member being capable of loading/unloading discs having various diameters; a driving unit actuating the lever member; and a diameter detector detecting the diameter of the disc, the method including: detecting a diameter of a disc inserted into the optical disc device using the diameter detector; moving the lever member along a path that is dependent on the diameter of the disc so as to load the disc to a position at which a center of the disc is aligned with the center of the turntable; coupling the disc to the turntable; escaping the lever member from an edge of the disc to allow writing/reading data to/from the disc to be performed; and writing/reading data to/from the disc.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
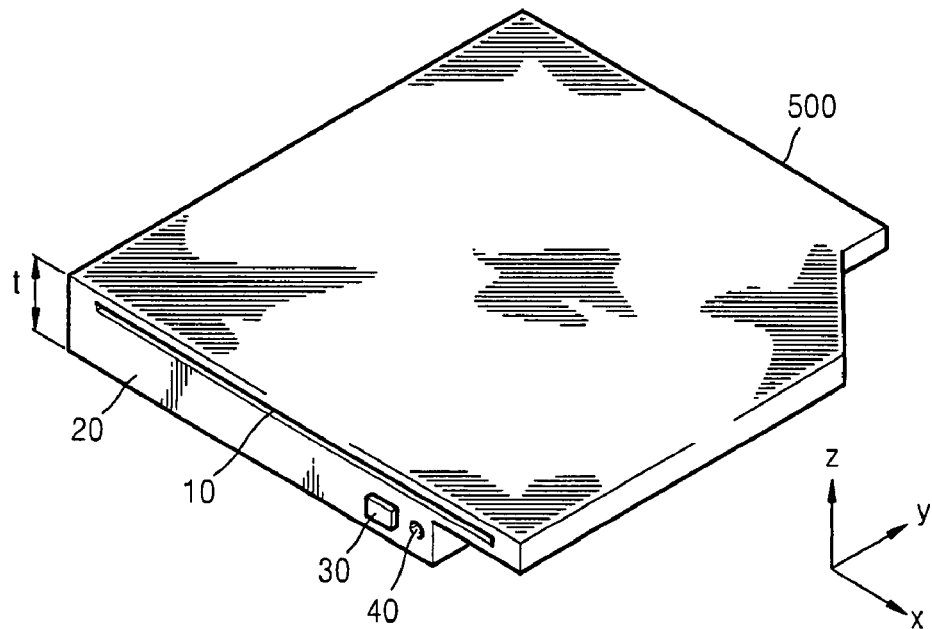
FIG. 1 is a perspective view illustrating an optical disc device according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, like reference numerals denote like elements.

FIG. 1 is a perspective view illustrating an optical disc device according to an embodiment of the present invention. A bezel 20 is formed on the front of the optical disc device. The bezel 20 includes a slot 10 through which a disc is inserted and ejected. When an eject button 30 formed on the bezel 20 is pressed, a disc loaded in the optical disc device is removed from the optical disc device. A display lamp 40 is used to display the operation status of the optical disc device. In one embodiment of the present invention, the optical disc device may be a slim optical disc device having a thickness less than a predetermined thickness (for example, 12.7 mm) that can be installed in a notebook computer. A lever member and a driving unit (described later) of the present invention are designed into compact shapes with fewer components, so that the optical disc device can be formed into a slim shape using the lever member and the driving unit.

Figure 2:
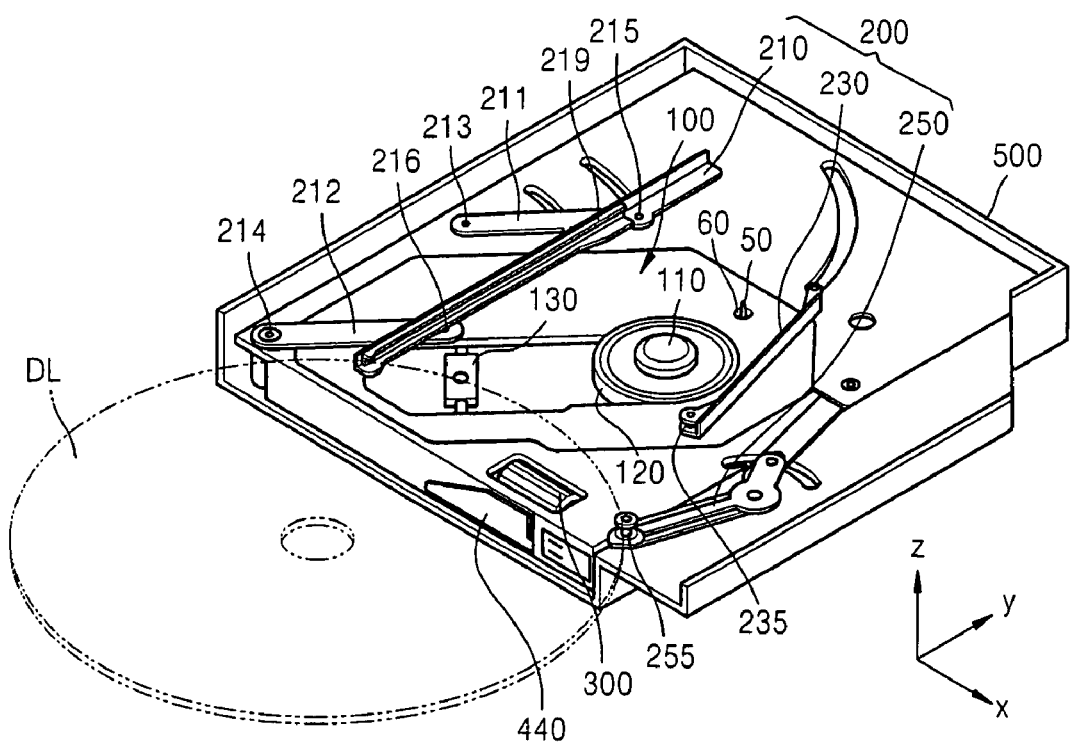
FIG. 2 is a perspective view illustrating how a large-diameter disc pushes a guide lever and a loading lever in the optical disc device according to an embodiment of the present invention.

FIG. 2 is a perspective view illustrating how a large-diameter disc DL pushes a guide lever 210 and a loading lever 250 in the optical disc device according to an embodiment of the present invention. Referring to FIG. 2, the optical disc device includes a main unit 100 and a lever member 200.

The main unit 100 includes a turntable 110 receiving a disc, a spindle motor 120 rotating the turntable 110, an optical pick-up unit 130, and a feed motor (not shown) moving the optical pick-up unit 130 in a tracking direction.

The lever member 200 guides a disc inserted through the slot 10 to a position where the center of the disc is aligned with the center of the turntable 110 and the disc is coupled with the turntable 110. When the disc is unloaded, the disc is decoupled from the turntable 110 and guided by the lever member 200 in a reverse direction. The driving unit actuates the lever member 200 to load and unload a disc and moves the main unit 100 in a vertical direction to couple/decouple the disc to/from the turntable 110.

The lever member 200 includes an eject lever 230, the guide lever 210, and the loading lever 250. The eject lever 230 applies an elastic force to a disc in an unloading direction (a negative y-axis direction) so as to unload the disc.

The guide lever 210 includes a disc guide surface 219 extending straight in a loading direction (a positive y-axis direction). The guide lever 210 has a 4-bar link structure and moves while maintaining a shape approximately parallel with the loading direction. Therefore, a disc can be stably loaded/ unloaded in/from the optical disc device.

The guide lever 210 may move with a first and second auxiliary links 211 and 212 in a parallelogrammic form. In this case, the guide lever 210 can move in a predetermined direction without rotation. One end of the first auxiliary link 211 is rotatably fixed to one side of the optical disc device using a first auxiliary link hinge 213, and the other end of the first auxiliary link 211 is rotatably fixed to the guide lever 210 using a first guide lever hinge 215. Similarly, one end of the second auxiliary link 212 is rotatably fixed to one side of the optical disc device using a second auxiliary link hinge 214, and the other end of the second auxiliary link 211 is rotatably fixed to the guide lever 210 using a second guide lever hinge 216. The first auxiliary link 211 may have the same length as the second auxiliary link 212.

The loading lever 250 is formed adjacent to the slot 10 and loads a disc inserted into the slot 10 by pushing the disc. When the disc is unloaded, the loading lever 250 is moved in a reverse direction to guide the disc to the slot 10. The guide lever 210 and the loading lever 250 are operated using a plurality of cams and may be elastically biased in a predetermined direction for precise position control. In one embodiment, a guide lever spring 218 (refer to FIG. 7) can be attached to the first auxiliary link 211 so as to elastically push the guide lever 210 against a disc. Though not shown, elastic members can be provided for the loading lever 250 and the eject lever 230 so as to elastically push the loading lever 250 and the eject lever 230 against a disc.

Figure 3:
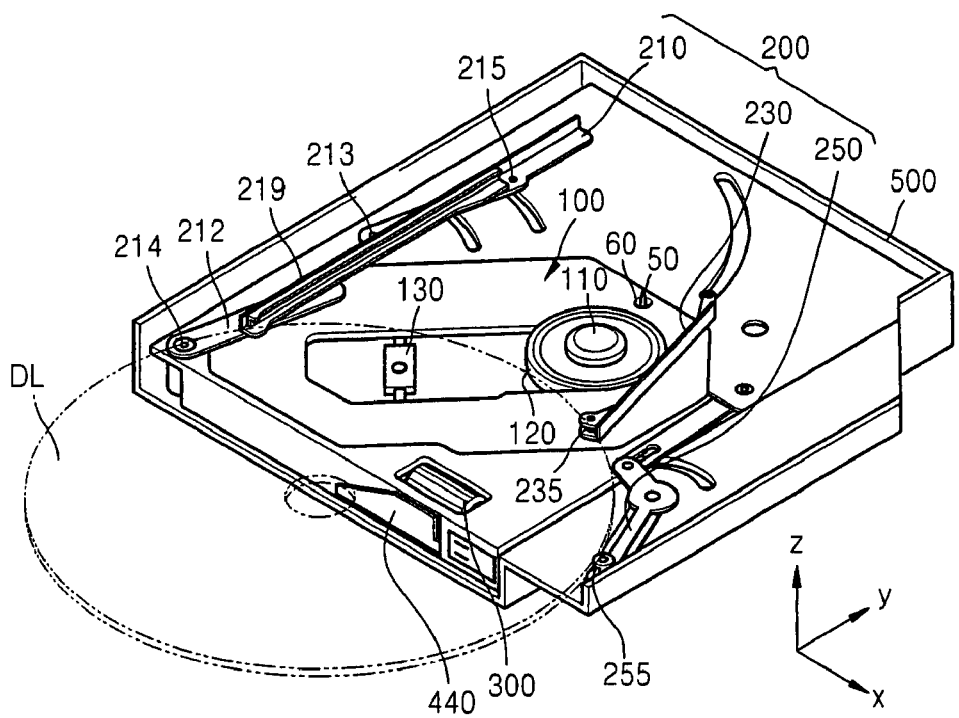
FIG. 3 is a perspective view illustrating how a large-diameter disc makes contact with an eject lever after the large-diameter disc moves the guide lever and the loading lever in the optical disc device according to an embodiment of the present invention.

FIG. 3 is a perspective view illustrating how a large-diameter disc DL makes contact with the eject lever 230 after the large-diameter disc DL moves the guide lever 210 and the loading lever 250 in the optical disc device according to an embodiment of the present invention. When both the guide lever 210 and the loading lever 250 are pushed by a disc manually inserted, the guide lever 210 and the loading lever 250 can be unlocked (described later in detail). When a large-diameter disc DL is inserted, the guide lever 210 and loading lever 250 are pushed by the large-diameter disc DL, and thus a loading space can be formed for the large-diameter disc DL. In this state, when the large-diameter disc DL is further inserted, the large-diameter disc DL starts to push the eject lever 230. Meanwhile, a driving switch 460 (refer to FIG. 11) can be used to turn on the driving unit to actuate the lever member 200.

When a disc manually inserted through the slot 10 reaches an on-position of the driving switch 460, the driving switch 460 is turned on, and the driving unit starts to operate (not shown). When the disc is unloaded away from the on-position of the driving switch 460, the driving switch 460 is turned off, and the driving unit stops. Here, the disc can be unloaded by an elastic force applied to the disc by the eject lever 230. The ejection lever 230 may also include a disk contact portion 235 for guiding the disk.

As described in FIGS. 11 through 18, the driving switch 460 may be formed at a predetermined position in a path along which the eject lever 230 moves so as to be turned on and off by the contact with the eject lever 230. For example, the driving switch 460 may be turned on when an inserted disc passes across an imaginary line drawn from the disc contact portion 255 of the loading lever 250 perpendicular to the guide lever 210.

Figure 4:
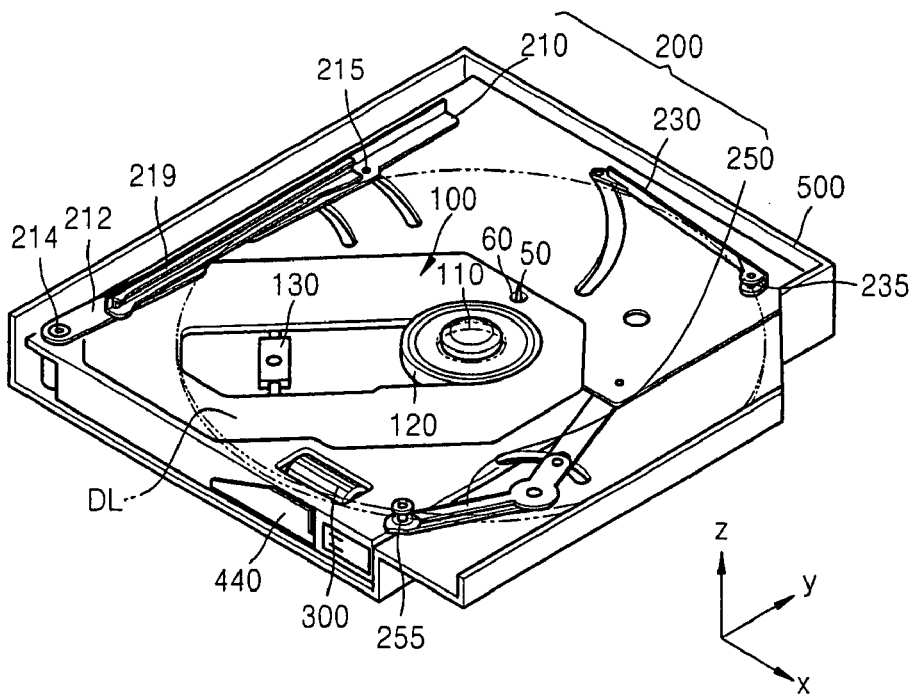
FIG. 4 is a perspective view illustrating a large-diameter disc that is loaded in the optical disc device but not yet coupled with a turntable according to an embodiment of the present invention.
Figure 5:
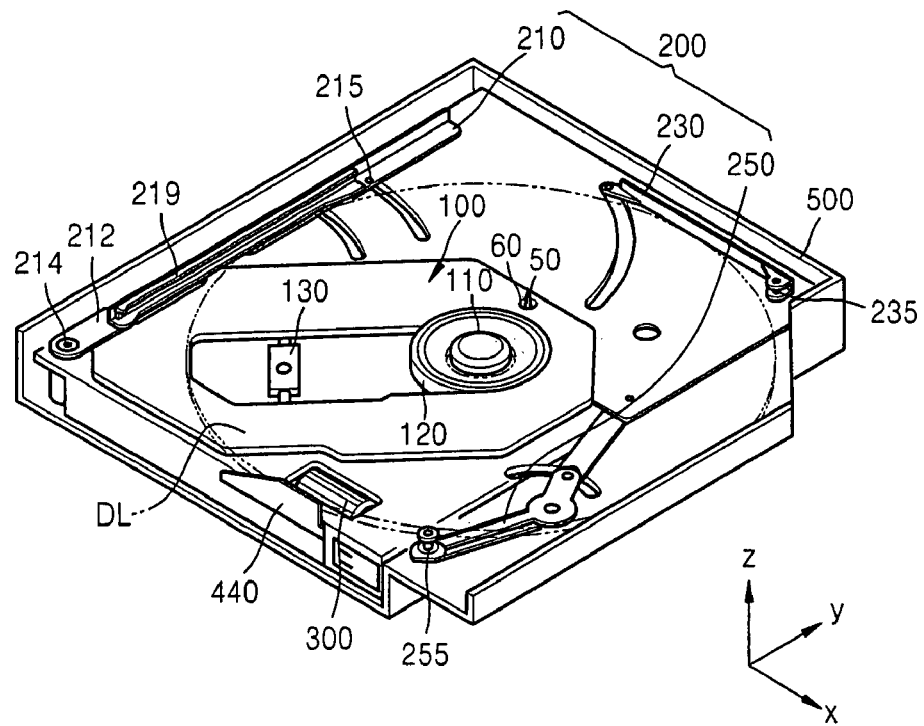
FIG. 5 is a perspective view illustrating how the large-diameter disc depicted in FIG. 4 is coupled with the turntable and a lever member is positioned off the large-diameter disc according to an embodiment of the present invention.

FIG. 4 is a perspective view illustrating a large-diameter disc DL that is loaded in the optical disc device but not yet coupled with the turntable 110 according to an embodiment of the present invention. When a disc is loaded to a position where the center of the disc is aligned with the center of the turntable 110, the driving unit lifts the turntable 110 to couple the disc with the turntable 110. FIG. 5 is a perspective view illustrating the large-diameter disc DL of FIG. 4 when the large-diameter disc DL is coupled with the turntable 110 and the lever member 200 is retracted from the large-diameter disc DL according to an embodiment of the present invention. After the disc is coupled with the turntable 110, the lever member 200 departs from the disc so as to allow rotation of the disc. Here, the driving source moves the lever member 200 away from the disc.

The large-diameter disc DL is decoupled and unloaded from the optical disc device in reverse of the order illustrating in FIGS. 2 through 5. A decoupling rod 50 is formed on a frame 500 forming the outside of the optical disc device. The main unit 100 includes a decoupling rod hole 60 through which the decoupling rod 50 exposes to push a disc coupled with the turntable 110 so as to decouple the disc from the turntable 110. Although not shown, the main unit 100 includes a boss on a side portion, and a main slider 350 (refer to FIG. 7) includes a cam corresponding to the boss on a side portion. Therefore, when the main slider 350 is straightly moved, the main unit 100 can be moved up and down. When the main unit 100 is moved down, the decoupling rod 50 exposes through the decoupling rod hole 60 and pushes a disc coupled with the turntable 110 so as to decouple the disc from the turntable 110.

Figure 6:
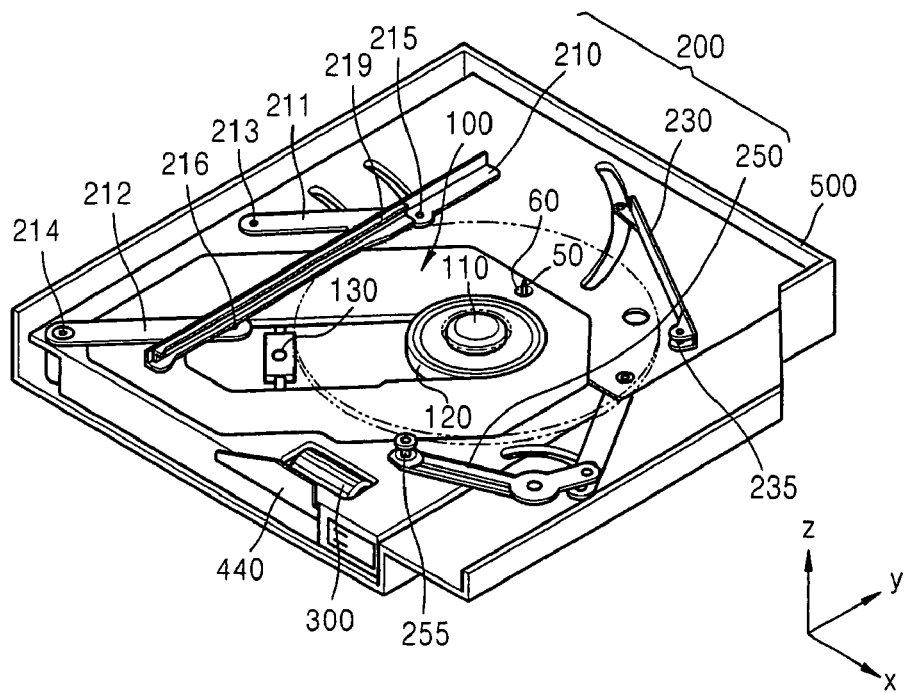
FIG. 6 is a perspective view illustrating how a small-diameter disc is coupled with the turntable and the lever member is positioned off the small-diameter disc in the optical disc device according to an embodiment of the present invention.

FIG. 6 is a perspective view illustrating the optical disc device when a small-diameter disc DS is coupled with the turntable 110 and the lever member 200 is positioned off the small-diameter disc DS according to an embodiment of the present invention. The lever member 200 moves in different paths according to the diameter of a disc inserted into the optical disc device. When a small-sized disc DS is inserted into the optical disc device as shown in FIG. 6 (that is, when the small-diameter disc DS is loaded in the optical disc device), the guide lever 210 is kept at a locked state. After that, the small-diameter disc DS is coupled with the turntable 110, and the guide lever 210 is moved away from the small-diameter disc DS. The loading lever 250 is moved much more when a small-diameter disc DS is loaded than when a large-diameter disc DL is loaded. However, the eject lever 230 is moved much less when a small-diameter disc DS is loaded when a large-diameter disc DL is loaded.

Referring to FIGS. 5 and 6, a shutter 440 is lifted to block the slot 10. When a disc is loaded in the optical disc device and another disc is inserted into the slot 10, the lever member 200 or other components can be damaged. Therefore, the shutter 440 is lifted to block the slot 10 when a disc is loaded in the optical disc device and is moved down to open the slot 10 when no disc is loaded in the optical disc device. For this, the shutter 440 may be moved by the main slider 350. The main slider 350 can move the shutter 440 by various mechanisms (not shown).

Figure 7:
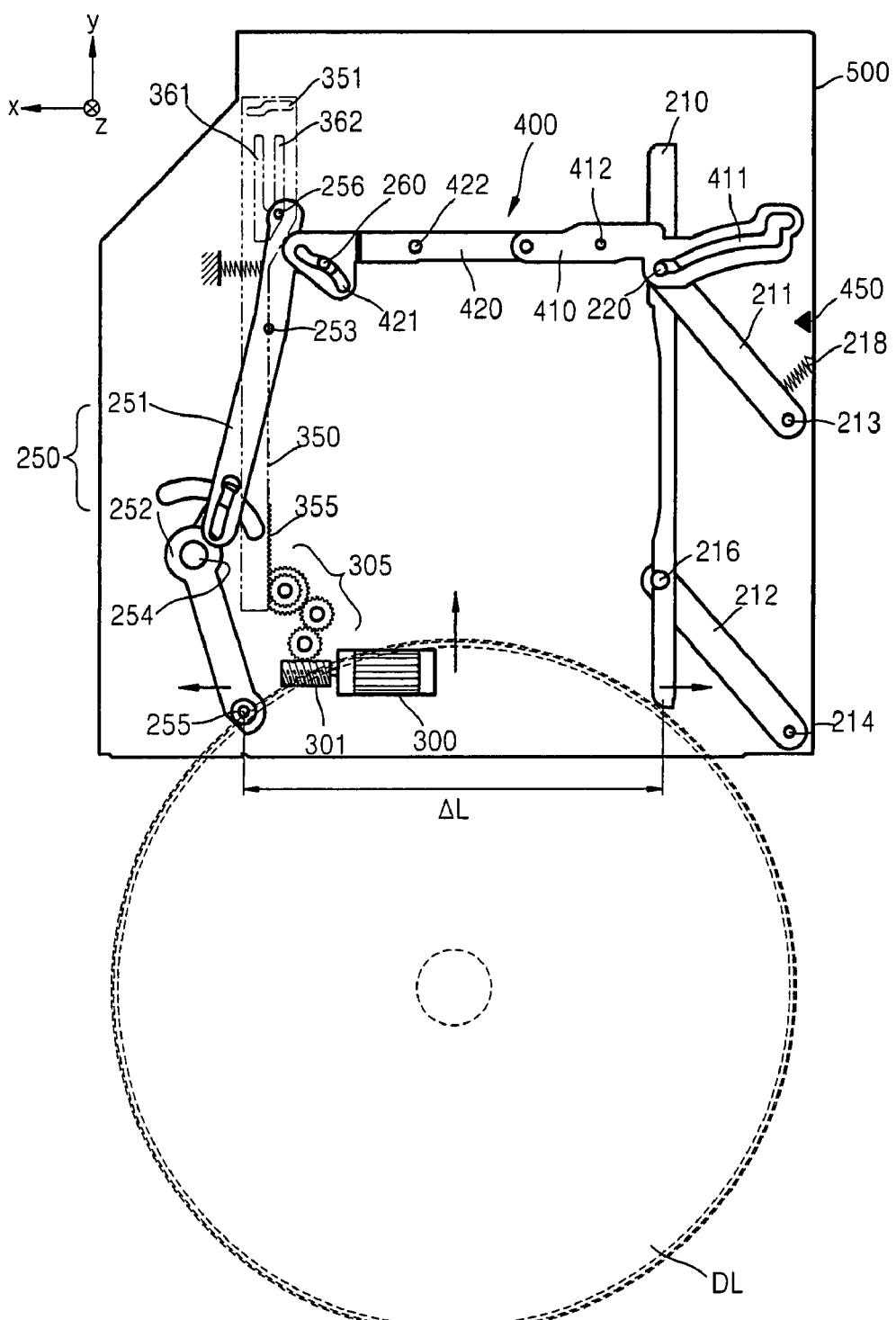
FIG. 7 is a bottom view illustrating the optical disc device when a locking unit and the lever member are in a locked state according to an embodiment of the present invention.
Figure 8:
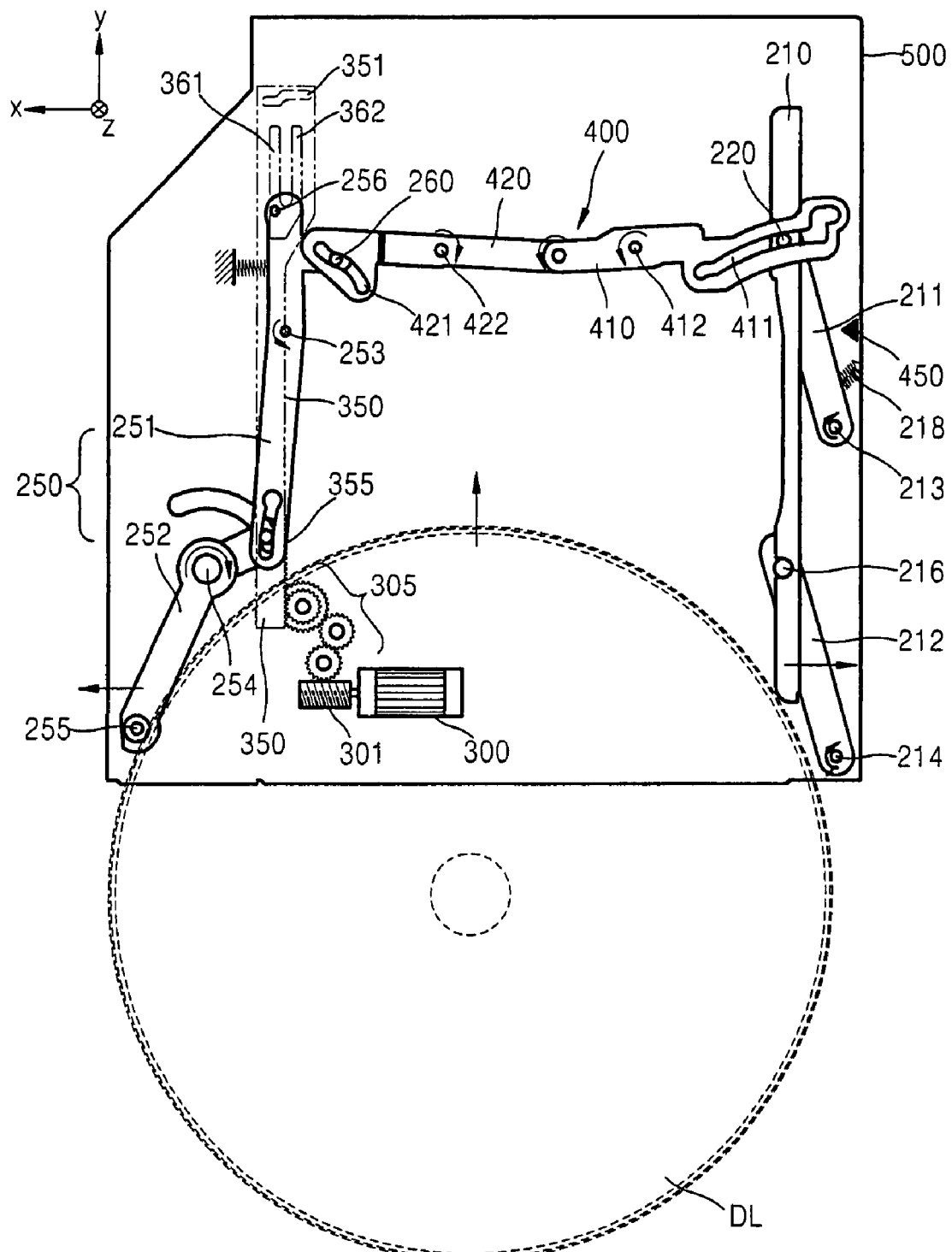
FIG. 8 is a bottom view illustrating the optical disc device when the locking unit and the lever member are unlocked by a large-diameter disc inserted into the optical disc device according to an embodiment of the present invention.

FIG. 7 is a bottom view illustrating the optical disc device when a locking unit 400 and the lever member 200 are in a locked state according to an embodiment of the present invention, and FIG. 8 is a bottom view illustrating the optical disc device when the locking unit 400 and the lever member 200 are unlocked by a large-diameter disc DL inserted into the optical disc device according to an embodiment of the present invention. Referring to FIGS. 7 and 8, locked and unlocked states of the locking unit 400 and the lever member 200 are illustrated. In standby mode, the locking unit 400 locks the guide lever 210 and the loading lever 250. When both the guide lever 210 and the loading lever 250 are pushed by a disc inserted through the slot 10, the locking unit 400 unlocks the guide lever 210 and the loading lever 250. The driving unit includes a driving source 300 and the main slider 350. The main slider 350 is connected to the driving source 300 through a worm gear 301, a gear train 305, and a rack 355. While moving straightly, the main slider 350 actuates the lever member 200.

The main slider 350 includes a first and second loading cams 361 and 362. Owing to the first and second loading cams 361 and 362, the loading lever 250 can move along the circumference of a disc inserted into the optical disc device. When a large-diameter disc DL is inserted through the slot 10, the first loading cam 361 is used for the loading lever 250 to load the large-diameter disc DL. When a small-diameter disc DS is inserted into the slot 10, the second loading cam 362 is used for the loading lever 250 to load the small-diameter disc DS.

When a disc is inserted into the slot 10, the loading lever 250 is pushed by the disc, and the amount of movement of the loading lever 250 by the disc determines whether the first loading cam 361 or the second loading cam 362 is used. In other words, a loading cam boss 256 of the loading lever 250 engages with one of the first and second loading cams 361 and 362 according to the diameter of a disc inserted into the slot 10.

The loading cam boss 256 is positioned adjacent to the second loading cam 362 in standby mode as shown in FIG. 7. When a large-diameter disc DL is manually inserted into the slot 10 as shown in FIG. 8, the loading cam boss 256 moves toward the first loading cam 361 since the amount of movement of the loading lever 250 by the large-diameter disc DL is relatively large. As the large-diameter disc DL is further inserted, the driving unit is turned on to transmit power to the main slider 350. As a result, the loading cam boss 256 moves along the first loading cam 361.

Figure 9:
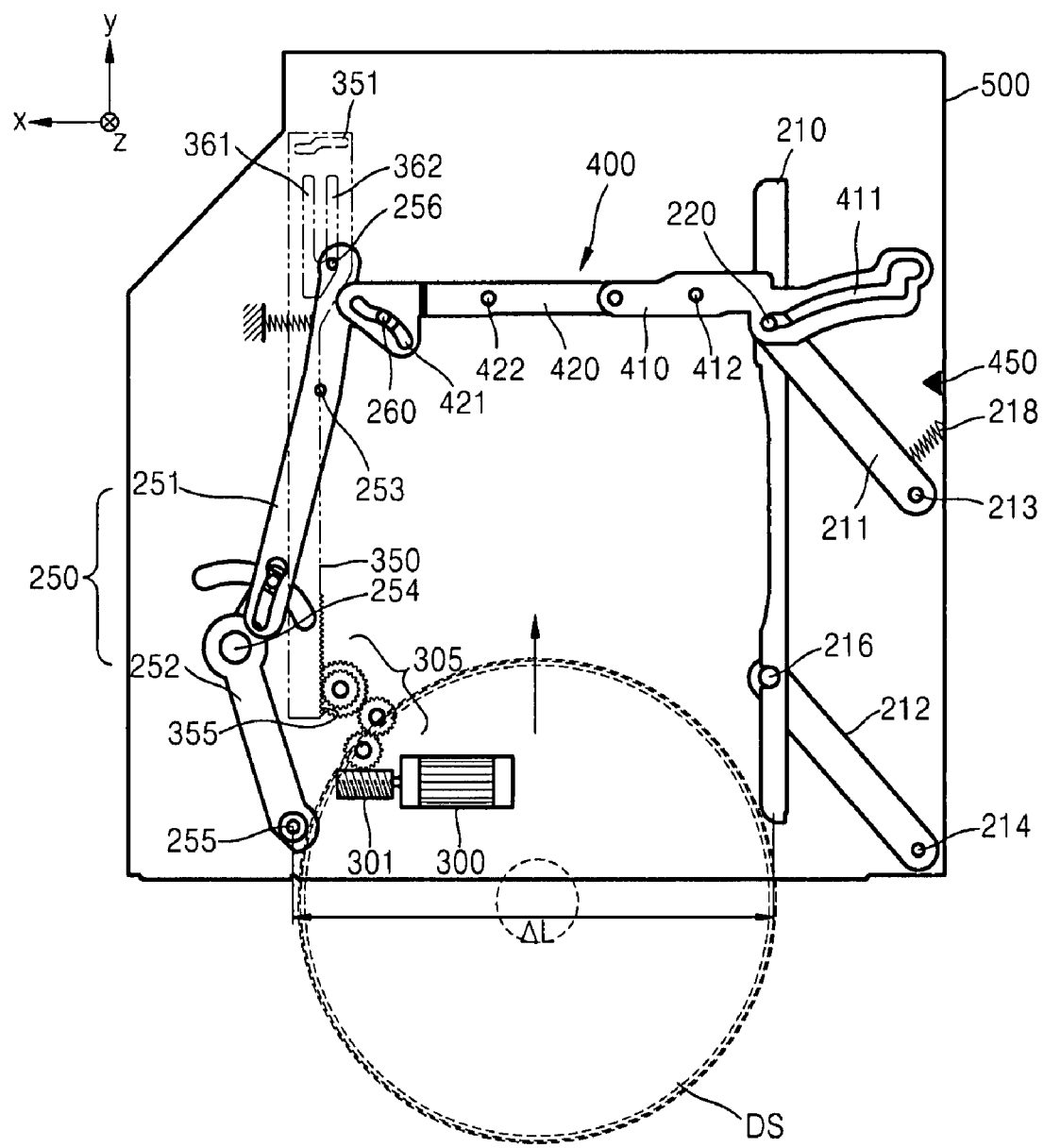
FIG. 9 is a bottom view illustrating the relationship between the locking unit and a small-diameter disc according to an embodiment of the present invention.

When a small-diameter disc DS is manually inserted into the optical disc device as shown in FIG. 9, the loading cam boss 256 stays at the standby-mode position adjacent to the second loading cam 362 since the amount of movement of the loading lever 250 by the small-diameter disc DS is relatively small. As the small-diameter disc DS is further inserted, the driving unit is turned on to transmit power to the main slider 350. As a result, the loading cam boss 256 moves along the second loading cam 362. In this way, the loading cam boss 256 and the loading lever 250 move along different paths according to the diameter of a disc inserted into the optical disc device. That is, the loading lever 250 can be used to load discs having various diameters.

The loading lever 250 includes a first and second loading levers 251 and 252. One end of the first loading lever 251 is connected to the main slider 350 by the loading cam boss 256, and the first loading lever 251 can be rotated on a first loading lever hinge 253. The second loading lever 252 can be rotated on a second loading lever hinge 254. One end of the second loading lever 252 is connected to the other end of the first loading lever 251 by a pivot, and the other end of the second loading lever 252 is formed with a disc contact portion 255.

The locking unit 400 includes first and second links 410 and 420. The first link 410 includes a first cam 411. As the first cam 411 moves, the first link 410 rotates on a first hinge 412. The first cam 411 is engaged with a first boss 220 formed on the guide lever 210. The second link 420 includes a second cam 421. As the second cam 421 moves, the second link 420 rotates on a second hinge 422. The second cam 421 is engaged with a second boss 260 formed on the loading lever 250.

Figure 10:
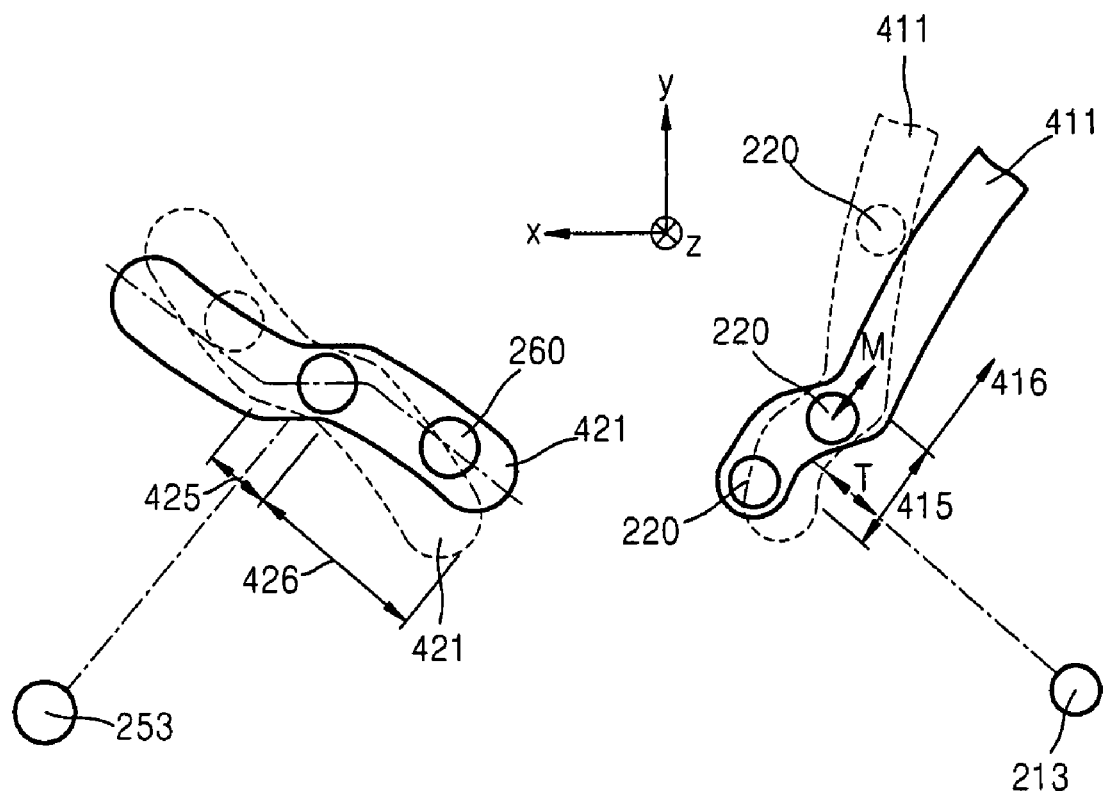
FIG. 10 is an enlarged bottom view illustrating a first and second locking portions of the optical disc device according to an embodiment of the present invention.

An end of the first link 410 opposite to the first cam 411 is connected to an end of the second link 420 opposite to the second cam 421 by a pivot. Referring to FIG. 10, the first cam 411 includes a first locking portion 415 at a bent section, and the second cam 421 includes a second locking portion 425 at a bent section. The first locking portion 415 holds the first boss 220 of the guide lever 210 to lock the guide lever 210, and the second locking portion 425 holds the second boss 260 of the loading lever 250 to lock the loading lever 250. When a large-diameter disc DL is manually inserted into the optical disc device, the first and second links 410 and 420 coupled to each other by a pivot are rotated in opposite directions. In this case, the first and second bosses 220 and 260 are moved away from the first and second locking portions 415 and 425, such that the guide lever 210 and the loading lever 250 can be unlocked. On the other hand, when a small-diameter disc DS is inserted into the optical disc device, the first and second links 410 and 420 are not rotated, and thus the guide lever 210 and the loading lever 250 are kept at a locked state.

Referring to FIGS. 7, 8, and 10, in operation, the first boss 220 rotates about the first auxiliary link hinge 213, and the second boss 260 rotates about the first loading lever hinge 253. Referring to FIG. 10, the first and second cams 411 and 421 are denoted by a solid line for a locking state and a dashed line for an unlocking state.

For example, when a large-diameter disc DL is manually inserted into the optical disc device in a locking state, a moment is applied to the first loading lever 251 to rotate the first loading lever 251 counterclockwise on the first loading lever hinge 253. At this time, the second boss 260 applies a moment to the second link 420 to rotate the second link 420 clockwise on the second hinge 422, and the second link 420 applies a moment to the first link 410 coupled to the second link 420 by a pivot to rotate the first link 410 counterclockwise on the first hinge 412. Therefore, the first cam 411 is positioned as indicated by a dashed line in FIG. 10. However, since the first locking portion 415 applies a force (T) to the first boss 220 in a direction pointing to the first auxiliary link hinge 213, the first boss 220 cannot be unlocked.

In this sate, when a moment (M) is applied to the first auxiliary link 211 to rotate the first auxiliary link 211 clockwise, the first boss 220 receives the moment (M). Thus, the first boss 220 can be moved away from the first locking portion 415 of the first cam 411 to an unlocked position. That is, when both the loading lever 250 and the guide lever 210 are pushed, the loading lever 250 and the guide lever 210 can be unlocked. When only one of the loading lever 250 and the guide lever 210 is pushed, locking is not released.

FIG. 9 is a bottom view illustrating the relationship between the locking unit 400 and a small-diameter disc DS according to an embodiment of the present invention. In a standby mode, a distance ΔL measured between the loading lever 250 and the guide lever 210 adjacent to the slot 10 may be larger than the diameter of a small-diameter disc DS but smaller than the diameter of a large-diameter disc DL. Therefore, when a large-diameter disc DL is manually inserted into the optical disc device, the guide lever 210 and the loading lever 250 are both pushed, and thus locking can be released. However, when a small-diameter disc DS is manually inserted into the optical disc device, only one of the guide lever 210 and loading lever 250 is pushed, and thus locking cannot be released.

Referring to FIG. 10, the first and second cams 411 and 412 include first and second loading portions 416 and 426, respectively. When a large-diameter disc DL is loaded, the first and second bosses 220 and 260 move along the first and second loading portion 416 and 426. When a small-diameter disc DS is loaded, the first boss 220 stays at the first locking portion 415, and the second boss 260 moves along the second loading portion 426. The small-diameter disc DS passes between the guide lever 210 and the loading lever 250 that are locked and then moves the eject lever 230 to turn on the driving switch 460. When the driving switch 460 is turned on, although the guide lever 210 is locked, the loading lever 250 moves along the second loading portion 426 to load the small-diameter disc DS. That is, when a large-diameter disc DL is inserted, the guide lever 210, the eject lever 230, and the loading lever 250 are moved to load the large-diameter disc DL. When a small-diameter disc DS, the guide lever 210 stays at a locked state, and only the eject lever 230 and the loading lever 250 move to load the small-diameter disc DS.

The optical disc device of the present invention may include a diameter detector so as to detect the diameter of a disc inserted through the slot 10. The diameter detector includes a guide lever switch 450. When the guide lever 210 presses the guide lever switch 450 during loading of a disc, it is determined that the disc is a large-diameter disc DL. Operation time of the driving unit is determined by the diameter detector and the driving switch 460. When it is determined that a large-diameter disc DL is inserted, the operation time of the driving unit is adjusted to position the lever member 200 as illustrated in FIG. 5. When it is determined that a small-diameter disc DS is inserted, the operation time of the driving unit is adjusted to position the lever member 200 as illustrated in FIG. 6. Therefore, two or more driving switches 460 can be formed at different positions. In this case, one of the driving switches 460 is turned on depending on the diameter of a disc inserted into the optical disc device.

Figure 11:
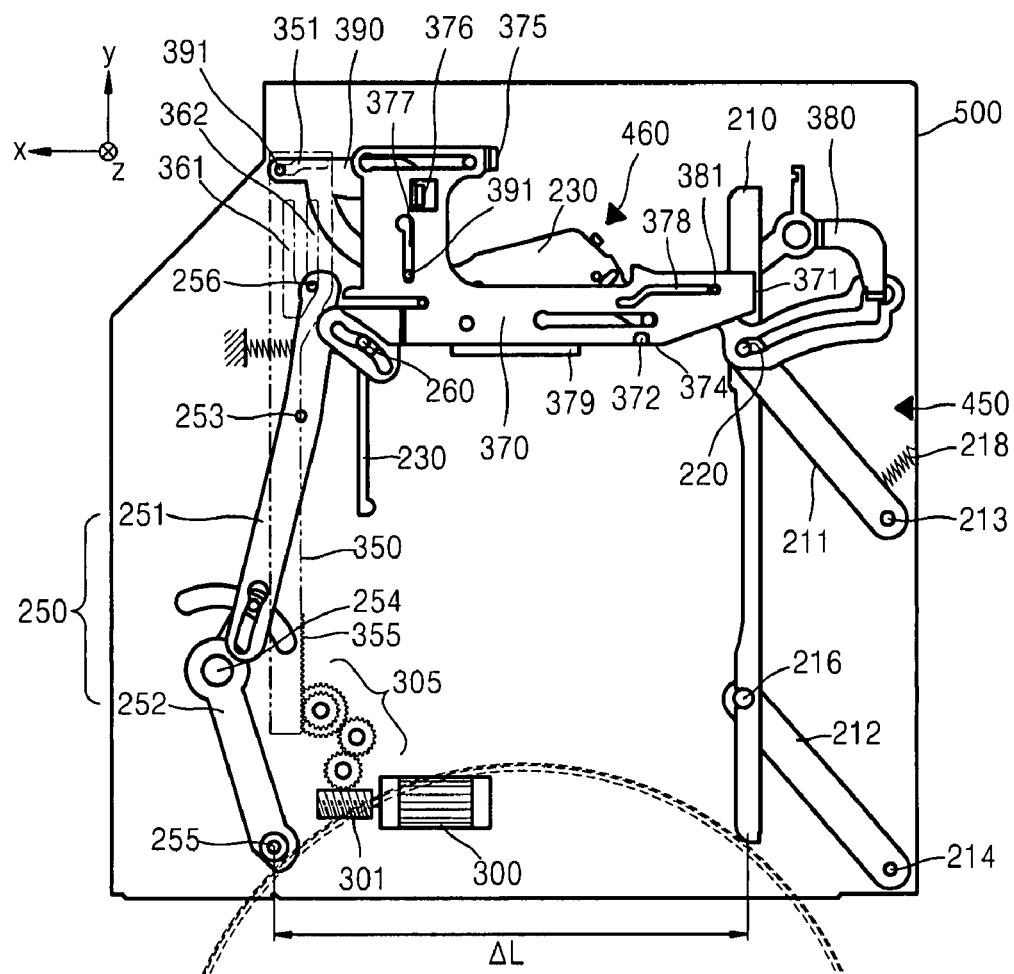
FIG. 11 is a bottom view illustrating a sub slider the optical disc device in standby mode according to an embodiment of the present invention.
Figure 12:
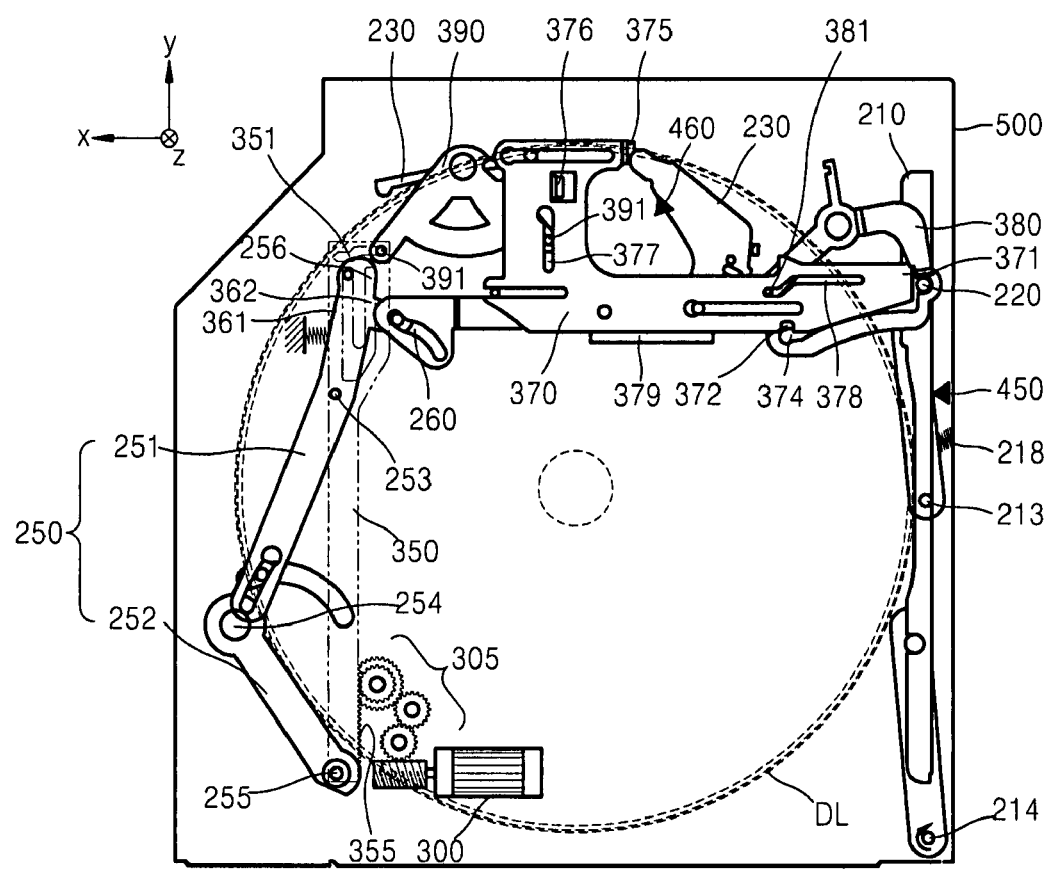
FIG. 12 is a bottom view illustrating the sub slider after a large-diameter disc is coupled with the turntable according to an embodiment of the present invention.
Figure 13:
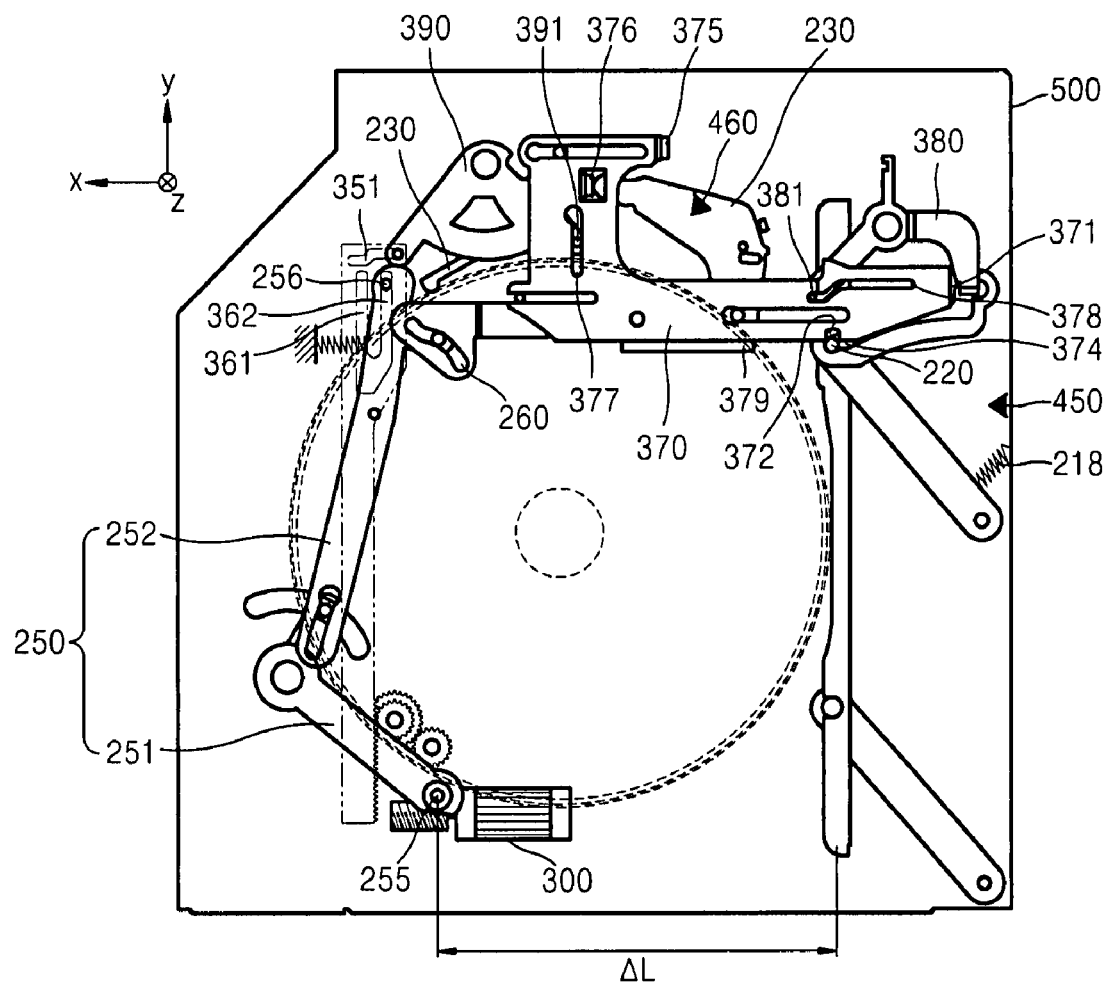
FIG. 13 is a bottom view illustrating the sub slider after a small-diameter disc is coupled with the turntable according to an embodiment of the present invention.

FIG. 11 is a bottom view illustrating a sub slider 370 of the optical disc device in standby mode according to an embodiment of the present invention, FIG. 12 is a bottom view illustrating the sub slider 370 after a large-diameter disc DL is coupled with the turntable 110 according to an embodiment of the present invention, and FIG. 13 is a bottom view illustrating the sub slider 370 after a small-diameter disc DS is coupled with the turntable 110 according to an embodiment of the present invention. Referring to FIGS. 11 through 13, the driving unit may further include the sub slider 370, a guide lever regulating link 380, and a connection link 390.

The sub slider 370 is connected to the main slider 350 by the connection link 390. The sub slider 370 can move in a reciprocating motion. The sub slider 370 includes first and second guide lever separators 371 and 372 used to move the guide lever 210 away from a disc loaded in the optical disc device to a different position depending on the diameter of the disc. The sub slider 370 further includes first and second eject lever separators 375 and 376 used to move the eject lever 230 away from a disc loaded in the optical disc device to a different position depending on the diameter of the disc.

When a large-diameter disc DL is coupled with the turntable 110, the first guide lever separator 371 moves the guide lever 210 away from the large-diameter disc DL. When a small-diameter disc DS is coupled with the turntable 110, the second guide lever separator 372 moves the guide lever 210 away from the small-diameter disc DS. When a large-diameter disc DL is coupled with the turntable 110, the first eject lever separator 375 moves the eject lever 230 away from the large-diameter disc DL. When a small-diameter disc DS is coupled with the turntable 110, the second eject lever separator 376 moves the eject lever 230 away from the small-diameter disc DS. It is determined whether the first guide lever separator 371 or the second guide lever separator 372 is used according to the amount of movement of the guide lever 210 by a disc inserted into the optical disc device. In the same manner, it is determined whether the first eject lever separator 375 or the second eject lever separator 376 is used according to the amount of movement of the eject lever 230 by a disc inserted into the optical disc device.

The sub slider 370 may further include a guide lever regulating portion 374 to regulate the movement of the guide lever 210 when a small-diameter disc DS is inserted into the optical disc device so as to push the guide lever 210 against the edge of the small-diameter disc DS. The sub slider 370 may further include a coupling/decoupling guide 379 that guides the main unit 100 when the main unit 100 is moved up for coupling with a disc and moved down for decoupling from the disc.

When a large-diameter disc DL is loaded, the guide lever regulating link 380 regulates the movement of the guide lever 210 to push the guide lever 210 against the edge of the large-diameter disc DL. Then, after the large-diameter disc DL is coupled with the turntable 110, the sub slider 370 rotates the guide lever regulating link 380 to release the guide lever 210. The guide lever regulating link 380 includes a boss 381 engaged with a cam 378 formed on the sub slider 370, such that the guide lever regulating link 380 can be interlocked with the sub slider 370.

The connection link 390 connects the main slider 350 and the sub slider 370, such that the main slider 350 can be interlocked with the sub slider 370. The main slider 350 and the sub slider 370 include connection link cams 351 and 377, respectively. The connection link cams 351 and 377 are engaged with connection link bosses 391 formed on the connection link 390, such that the connection link 390 can be interlocked with the main slider 350 and the sub slider 370. After a disc is coupled with the turntable 110, the loading lever 250 is moved away from the disc according to the profiles of the first and second loading cams 361 and 362.

Figure 14:
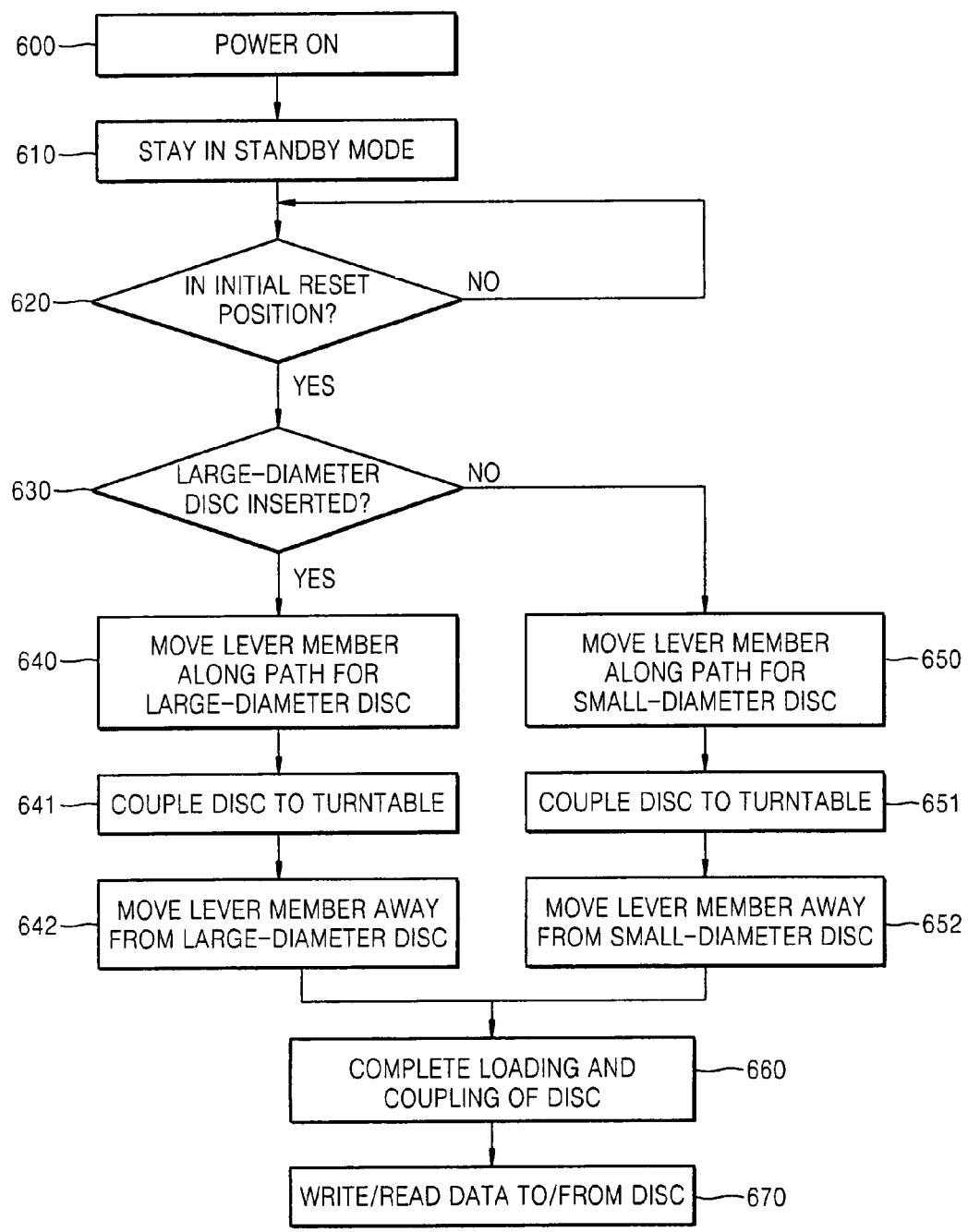
FIG. 14 is a flowchart for explaining a method of controlling an optical disc device according to an embodiment of the present invention.

FIG. 14 is a flowchart for explaining a method of controlling the optical disc device according to an embodiment of the present invention. In operation 600, an optical disc device is powered on. In operation 610, the main unit 100, the lever member 200, and the driving unit stay in standby mode. In operation 620, when a disc is inserted into the optical disc device through the slot 10, it is determined whether the main unit 100, the lever member 200, and the driving unit are placed at initial reset positions as shown in FIGS. 2, 7, and 11. If the main unit 100, the lever member 200, and the driving unit are not placed at the initial reset positions, the main unit 100, the lever member 200, and the driving unit are moved to the initial reset positions. If the main unit 100, the lever member 200, and the driving unit are placed at the initial reset positions, the diameter detector detects the diameter of the disc inserted through the slot 10 in operation 630.

If it is detected that the disc inserted through the slot 10 is a large-diameter disc DL, the lever member 200 guides the large-diameter disc DL to a predetermined position while moving along a path for a large-diameter disc DL so as to align the center of the large-diameter disc DL with the center of the turntable 110 in operation 640. In operation 641, the main unit 100 is lifted to couple the turntable 110 to the large-diameter disc DL. After that, in operation 642, the lever member 200 is positioned off the large-diameter disc DL.

If it is detected that the disc inserted through the slot 10 is a small-diameter disc DS, the lever member 200 guides the small-diameter disc DS to a predetermined position while moving along a path for a small-diameter disc DS so as to align the center of the small-diameter disc DS with the center of the turntable 110 in operation 650. In operation 651, the main unit 100 is lifted to couple the turntable 110 to the small-diameter disc DS. After that, in operation 652, the lever member 200 is positioned off the small-diameter disc DS.

In this way, the loading and coupling of the disc is completed in operation 660, no matter whether the disc is a large-diameter disc DL or a small-diameter disc DS. In operation 670, the optical disc device reads/writes data from/to the disc.

After that, the disc can be removed from the optical disc device in a reverse order. That is, the lever member 200 is moved onto the edge of the disc, and the main unit 100 is moved down to decouple the turntable 110 from the disc by pushing the disc using the decoupling rod 50. Next, the lever member 200 moves along a different path depending on the diameter of the disc so as to unload the disc from the optical disc device through the slot 10.

Figure 15:
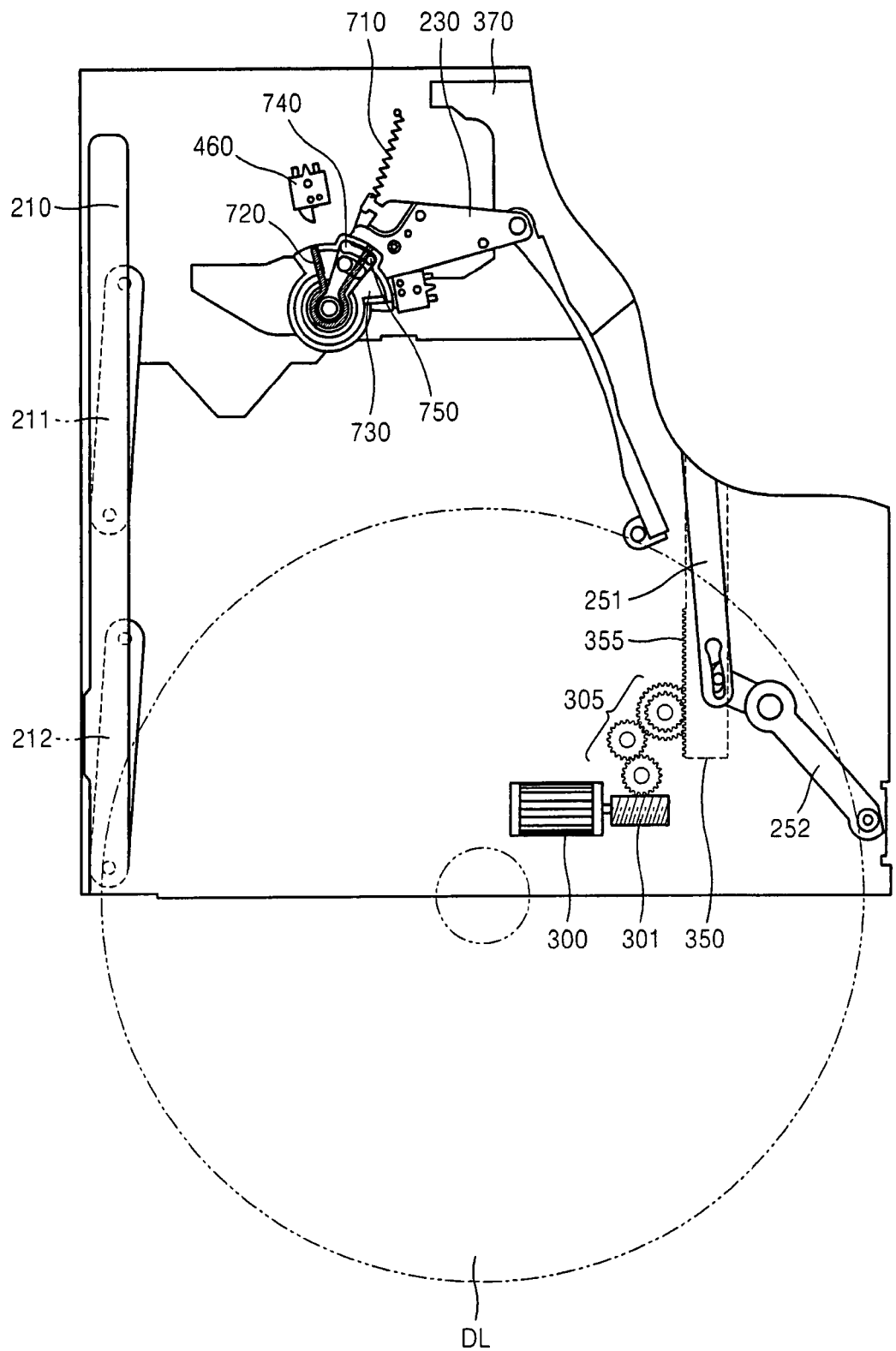
FIG. 15 is a plan view illustrating a protection unit of the optical disc device when a large-diameter disc is manually inserted into the optical disc device according to an embodiment of the present invention.
Figure 16:
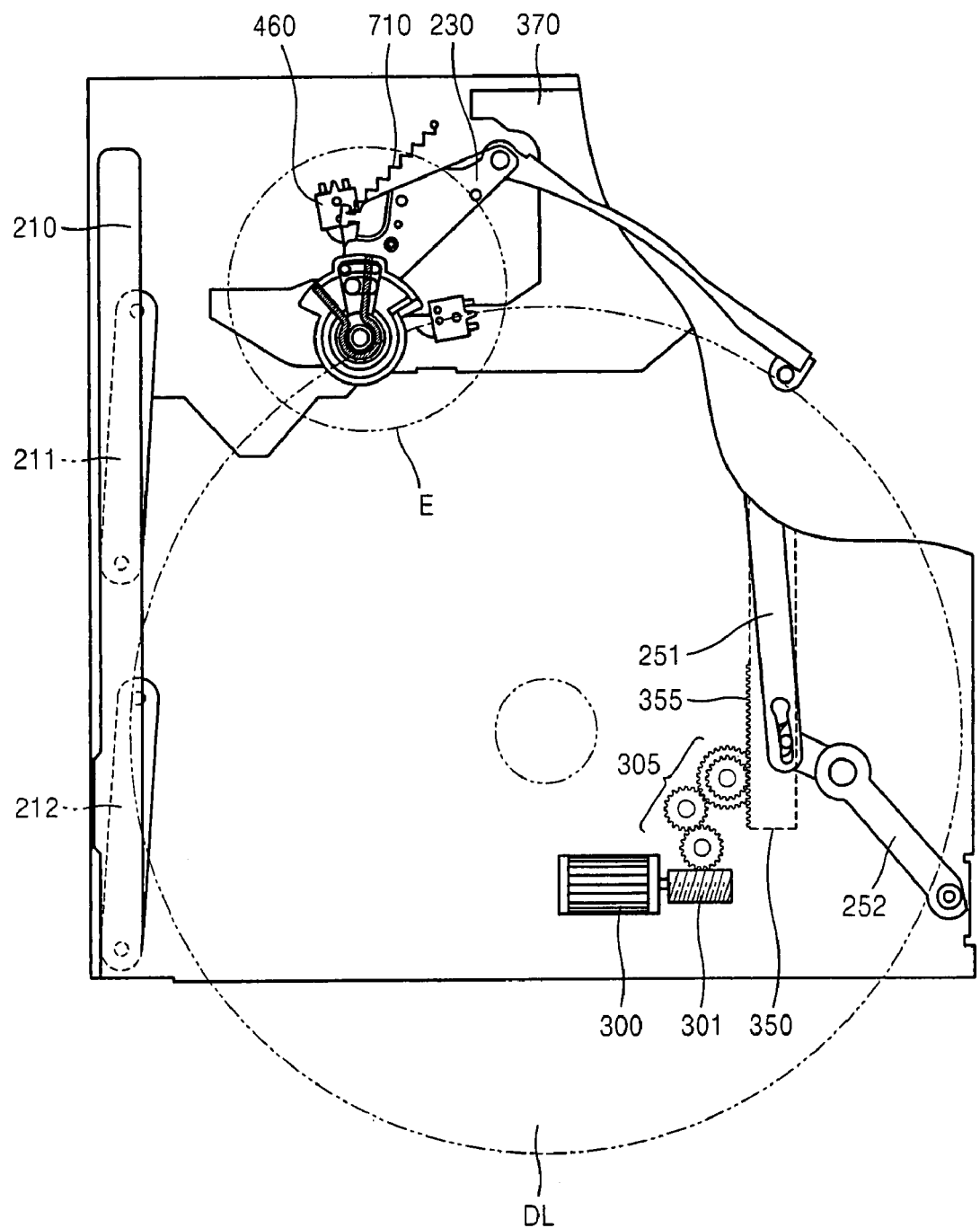
FIG. 16 is a plan view illustrating the optical disc device when a large-diameter disc is manually inserted to a position at which a driving unit is turned on according to an embodiment of the present invention.
Figure 17:
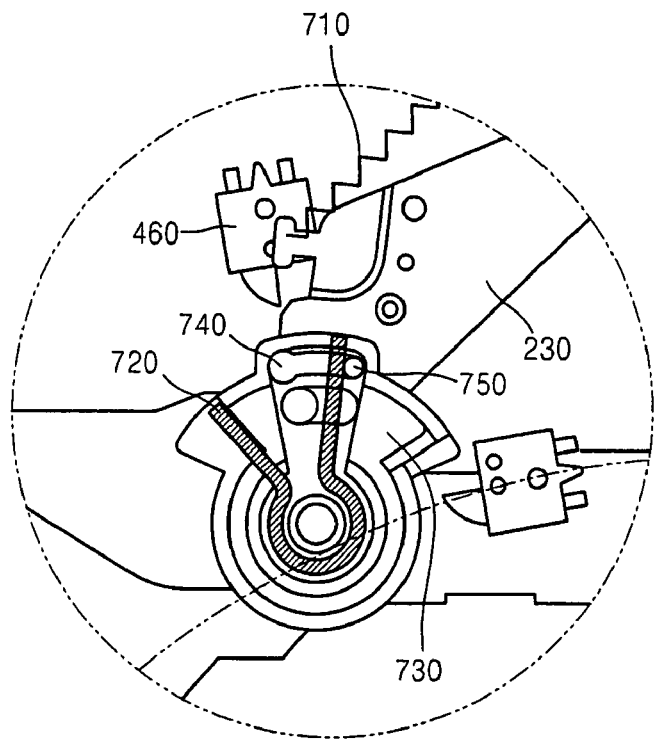
FIG. 17 is an enlarged view of portion E of FIG. 16, according to an embodiment of the present invention.
Figure 18:
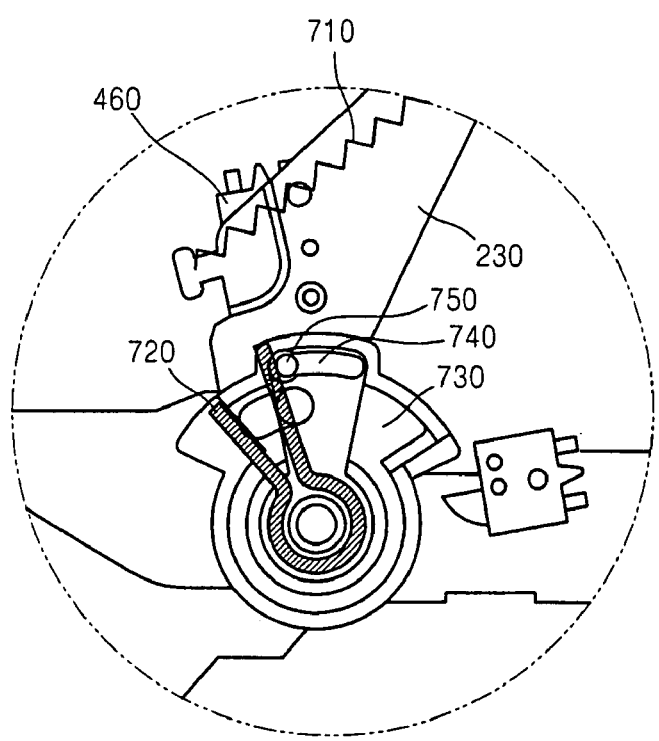
FIG. 18 is an enlarged view illustrating how the protection unit of the optical disc device absorbs a load acting in a loading direction of a disc according to an embodiment of the present invention.

FIG. 15 is a plan view illustrating a protection unit of the optical disc device when a large-diameter disc DL is manually inserted into the optical disc device according to an embodiment of the present invention, FIG. 16 is a plan view illustrating the optical disc device when the large-diameter disc DL is manually inserted to a position for turning on the driving unit according to an embodiment of the present invention, FIG. 17 is an enlarged view of portion E of FIG. 16, and FIG. 18 is an enlarged view illustrating how the protection unit of the optical disc device absorbs a load acting in the loading direction of a disc according to an embodiment of the present invention.

The structure and operation of the protection unit will now be described with reference to FIGS. 15 through 18. The protection unit protects the optical disc device by absorbing an abnormal load acting on the lever member 200 (refer to FIG. 3). Although the protection unit can absorb an abnormal load acting on the lever member 200 when a large-diameter disc DL or small-diameter disc DS is loaded/unloaded, only a large-diameter disc DL is illustrated in FIGS. 15 through 18 for clarity. The path along which the lever member 200 moves when a small-diameter disc DS is loaded/unloaded is illustrated in FIGS. 6, 9, and 13.

Referring to FIG. 15, when a disc starts to be inserted into the optical disc device, the driving unit is in an off state. When the disc is further inserted to a position shown in FIG. 16, the driving switch 460 is pressed and thus the driving unit is turned on.

When power is supplied to the optical disc device and the driving unit is turned on, the lever member 200 is moved along a predetermined path by the driving unit. Therefore, the optical disc device is not damaged by the disc even when the disc is further inserted from the position shown in FIG. 16. However, when the optical disc device is powered off, the lever member 200 is not moved by the driving unit. In this state, if a disc is further inserted from the position shown in FIG. 16, an extreme load can be applied to the lever member 200 by the disc, and thus the lever member 200 or other components of the optical disc device can be damaged or broken. Furthermore, when a disc is unloaded from the optical disc device by the driving unit, the unloading of the disc can be hindered. In this case, the lever member 200 or other components of the optical disc device can receive an extreme load in the loading direction and thus can be damaged or broken. The protection unit absorbs such abnormal loads acting on the lever member 200.

In an embodiment of the present invention, the guide lever 210 includes the first and second auxiliary links 211 and 212, the loading lever 250 (refer to FIG. 2) includes the first and second loading levers 251 and 252, and power is transmitted from the driving source 300 to the main slider 350 and the rack 355 through the worm gear 301 and the gear train 305. When unlocked, the guide lever 210 (refer to FIG. 2) and the loading lever 250 of the lever member 200 are elastically biased in the unloading direction and can move along predetermined paths. When a large-diameter disc DL is manually inserted into the optical disc device, the guide lever 210 and the loading lever 250 are unlocked. Then, if the large-diameter disc DL is further inserted, the driving unit is turned on to actuate the guide lever 210 and the loading lever 250. At this time, since a force impacting the large-diameter disc DL can be transmitted to the driving unit through the guide lever 210 or the loading lever 250, the optical disc device can be damaged or broken. Furthermore, when the eject lever 230 is actuated by the driving unit, a force impacting the large-diameter disc DL can be transmitted to the driving unit through the eject lever 230. Thus, the optical disc device can be damaged or broken.

The protection unit can be formed at the eject lever 230 that is moved much more than other components of the lever member 200. In this case, the protection unit may include an absorption spring 720, a pressing portion 750, an eject lever detecting switch 730, and a pressing portion shelter groove 740.

The eject lever 230 is biased by an eject lever spring 710 in the unloading direction. The absorption spring 720 is provided separate from the eject lever spring 710 so as to absorb an abnormal load acting on the eject lever 230 in the loading direction. The pressing portion 750 is formed on the eject lever 230. The pressing portion 750 is contacted to the absorption spring 720 to compress the absorption spring 720. The eject lever detecting switch 730 interlocks with the eject lever 230. The eject lever detecting switch 730 is used to actuate the driving switch 460 according to the amount of movement of the eject lever 230 or is connected to the sub slider 370 to switch the operation mode of the optical disc device. The pressing portion shelter groove 740 is formed to separate the operation of the pressing portion 750 from that of the eject lever detecting switch 730. That is, owing to the pressing portion shelter groove 740, the movement of the eject lever detecting switch 730 is not hindered by the pressing portion 750. Therefore, even when the eject lever detecting switch 730 is not moved, the absorption spring 720 can be compressed by the movement of the eject lever 230 and the pressing portion 750. In one embodiment of the present invention, the absorption spring 720 may be a ring-shaped spring fitted on a rotation center of the eject lever 230. In this case, one end of the absorption spring 720 may be fixed to the eject lever detecting switch 730, and the other end of the absorption spring 720 may be contacted to the pressing portion 750.

FIGS. 15 through 17 shows the protection unit of the optical disc device when a large-diameter disc DL is manually inserted to a position where the driving unit is turned on. During the insertion of the large-diameter disc DL, the absorption spring 720 is rotated together with the eject lever detecting switch 730 without being compressed. When the large-diameter disc DL is forcibly inserted further from the position illustrated in FIGS. 16 and 17, the eject lever detecting switch 730 is not further rotated although the eject lever 230 is further rotated as shown in FIG. 18. In this case, the pressing portion 750 formed on the eject lever 230 compresses the absorption spring 720 to absorb an abnormal load caused by the forcibly inserted large-diameter disc DL. Meanwhile, when the optical disc device is powered on, the driving source 300 starts to actuate the rack 355 to move the main slider 350 from the position illustrated in FIGS. 16 and 17. However, when the optical disc device is not powered on, the driving source 300 is not operated even when the eject lever 230 is rotated to a position shown in FIG. 18. Thus the main slider 350 is not moved from an original standby-mode position.

As described above, the optical disc device and the method of controlling the optical disc device provide the following advantages. The number of components and total thickness of the optical disc device can be reduced. A disc can be inserted and remove from the optical disc device by an automatic slot-in method. Discs having various diameters can be loaded/unloaded in/from the optical disc device since the lever member can move along different paths depending on the diameter of a disc inserted into the optical disc device. The optical disc device can be protected from being damaged or broken since the protection unit absorbs an abnormal load acting on the optical disc device when an disc is loaded/unloaded.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical disc device comprising:
a main unit rotating a turntable when a disc is coupled to the turntable and including an optical pick-up unit writing/reading data to/from the disc;
a lever member guiding the disc to load the disc to a position at which a center of the disc is aligned with a center of the turntable and reversely guiding the disc to unload the disc; and
a driving unit actuating the lever member,
wherein the lever member moves along a different path according to a diameter of the disc so that the lever member is capable of loading/unloading discs having various diameters.

2. The optical disc device of claim 1, wherein the lever member comprises:
an eject lever applying an elastic force to the disc in an unloading direction of the disc;
a guide lever including a disc guide surface extending straight in a loading direction of the disc; and
a loading lever pushing the disc in a predetermined direction to load the disc and moving in a direction opposite to the predetermined direction when the disc is unloaded.

3. The optical disc device of claim 2, wherein the guide lever has a four-bar structure and moves substantially in parallel with the loading direction of the disc when the guide lever moves.

4. The optical disc device of claim 2, further comprising a locking unit locking the guide lever and the loading lever in a standby mode, the locking unit unlocking the guide lever and the loading lever when both the guide lever and the loading lever are pushed by a disc manually inserted through a slot of the optical disc device.

5. The optical disc device of claim 4, wherein the locking unit comprises:
a first link including a first cam connected to a first boss formed on the guide lever and rotating about a first hinge by a movement of the first cam; and
a second link including a second cam connected to a second boss formed on the loading lever and rotating about a second hinge by a movement of the second cam.

6. The optical disc device of claim 5, wherein an end of the first link, opposite to the end where the first cam is formed, is pivotably coupled to an end of the second link opposite to the end where the second cam is formed.

7. The optical disc device of claim 6, wherein:
the first link comprises a first locking portion at an inflection section;
the second link comprises a second locking portion at an inflection section; and
the first locking portion locks the guide lever by confining the first boss thereto, and the second locking portion locks the loading lever by confining the second boss thereto.

8. The optical disc device of claim 7, wherein when the first and second links are rotated in opposite directions by a disc manually inserted into the optical disc device, an extent of each inflection of the first and second locking portions are diminished such that the guide lever and the loading lever are unlocked.

9. The optical disc device of claim 7, wherein:
the first link comprises a first loading portion;
the second link comprises a second loading portion;
when a large-diameter disc is loaded/unloaded, the first and second bosses move respectively along the first and second loading portions; and
when a small-diameter disc is loaded/unloaded, the first boss is locked in the first locking portion and the second boss moves along the second loading portion.

10. The optical disc device of claim 2, wherein the driving unit comprises:
a driving source; and
a main slider including a rack connected to the driving source, the main slider actuating the lever member while moving straightly.

11. The optical disc device of claim 10, wherein the main slider further includes:
a first loading cam actuating the loading lever so as to move a large-diameter disc; and
a second loading cam actuating the loading lever so as to move a small-diameter disc.

12. The optical disc device of claim 11, wherein one of the first and second loading cams is selected by a variation of the amount of movement of the loading lever according to a diameter of a disc manually inserted through a slot of the optical disc device.

13. The optical disc device of claim 12, wherein the loading lever comprises a loading cam boss engaging with one of the first and second loading cams according to a diameter of the disc manually inserted through the slot of the optical disc device.

14. The optical disc device of claim 11, wherein the first and second loading cams move the loading lever away from a disc after the disc is coupled with the turntable.

15. The optical disc device of claim 10, wherein the driving unit further comprises a sub slider reciprocating in connection with the main slider for the sub slider to move in a reciprocating motion, the sub slider including a guide lever separator moving the guide lever away from the disc after the disc is coupled to the turntable and an eject lever separator moving the eject lever away from the disc after disc is coupled to the turntable.

16. The optical disc device of claim 15, wherein the guide lever separator comprises a first and second guide lever separators moving the guide lever away from the disc to different positions according to a diameter of the disc, and the eject lever separator comprises a first and second eject lever separators moving the eject lever away from the disc according to the diameter of the disc.

17. The optical disc device of claim 16, wherein one of the first and second guide lever separators is selected to move the guide lever away from the disc by the variation of the amount of movement of the guide lever according to a diameter of a disc manually inserted through a slot of the optical disc device.

18. The optical disc device of claim 16, wherein one of the first and second eject lever separators is selected to move the eject lever away from the disc by the variation of the amount of movement of the eject lever according to a diameter of a disc manually inserted through a slot of the optical disc device.

19. The optical disc device of claim 15, wherein the sub slider further includes a guide lever regulating portion that regulates movement of the guide lever when a small-diameter disc is loaded so as to push the guide lever against the small-diameter disc.

20. The optical disc device of claim 15, wherein the sub slider further includes a coupling/decoupling guide that guides the main unit when the main unit is lifted for coupling with the disc and moved down for decoupling from the disc.

21. The optical disc device of claim 15, wherein the driving unit further comprises a guide lever regulating link regulating movement of the guide lever when a large-diameter disc is loaded so as to push the guide lever against an edge of the large-diameter disc, the guide lever regulating link being rotated by the sub slider to release the guide lever after the large-diameter disc is coupled to the turntable.

22. The optical disc device of claim 15, wherein the driving unit further comprises a connection link connecting the main slider and the sub slider.

23. The optical disc device of claim 22, wherein the main slider further includes a connection link cam actuating the connection link.

24. The optical disc device of claim 10, wherein the loading lever comprises:
a first loading lever including an end connected to the main slider and capable of rotating about a first loading lever hinge; and
a second loading lever capable of rotating about a second loading lever hinge, the second loading lever including one end pivotably connect to the first loading lever and the other end making contact with an edge of a disc inserted into the optical disc device.

25. The optical disc device of claim 10, further comprising a shutter closing a slot of the optical disc device after a disc is loaded in the optical disc device.

26. The optical disc device of claim 25, wherein the shutter is actuated by the main slider.

27. The optical disc device of claim 2, wherein the guide lever and the loading lever are elastically biased toward the disc.

28. The optical disc device of claim 2, further comprising a diameter detector detecting a diameter of a disc inserted through a slot of the optical disc device.

29. The optical disc device of claim 28, wherein:
the diameter detector comprises a guide lever switch detecting a large-diameter disc; and
when the guide lever switch is pressed by the guide lever during loading of a disc, the disc is determined as a large-diameter disc.

30. The optical disc device of claim 2, wherein:
the driving unit comprises a driving switch used for turning on/off the driving unit; and
when a disc is manually inserted through a slot of the optical disc device to a predetermined position, the driving switch is turned on and the driving unit starts to operate, and when the disc is moved away from the predetermined position while being unloaded, the driving switch is turned off to stop the driving unit and the disc is unloaded by an elastic force of the eject lever.

31. The optical disc device of claim 2, wherein:
when a large-diameter disc is loaded/unloaded, the guide lever, the eject lever, and the loading lever are simultaneously moved; and
when a small-diameter disc is loaded/unloaded, the guide lever is locked, and the eject lever and the loading lever are moved.

32. The optical disc device of claim 31, wherein a distance between the guide lever and the loading lever measured adjacent to a slot of the optical disc device in a standby mode is larger than a diameter of the small-diameter disc and smaller than a diameter of the large-diameter disc.

33. The optical disc device of claim 1, wherein the optical disc device has a thickness less than or equal to 12.7 mm.

34. The optical disc device of claim 2, further comprising a protection unit elastically absorbing a load acting on the lever member in a loading direction of a disc when the disc is manually inserted over a position where the driving unit starts to operate.

35. The optical disc device of claim 34, wherein the protect unit elastically absorbs a load acting on the lever member in the loading direction of the disc when the disc is hindered while being unloaded by the driving unit.

36. The optical disc device of claim 35, wherein the protection unit comprises an absorption spring elastically absorbing a load acting on the eject lever in the loading direction of the disc, the absorption spring being provided separate from an eject lever spring elastically biasing the eject lever towards the unloading direct of the disc.

37. The optical disc device of claim 36, wherein the protection unit further comprises:
a pressing portion interlocking with the eject lever and compressing the absorption spring for elastically absorbing a load acting on the eject lever in the loading direction;
an eject lever detecting switch interlocking with the eject lever for turning on/off the driving unit; and
a pressing portion shelter groove preventing interference between the pressing portion and the eject lever detecting switch.

38. The optical disc device of claim 37, wherein even when a movement of the eject lever detecting switch is stopped, the absorption spring is elastically compressed by movement of the eject lever and the pressing portion.

39. The optical disc device of claim 38, wherein the absorption spring is a ring-shaped spring fitted on a rotation center of the eject lever, the ring-shaped spring including one end fixed to the eject lever detecting switch and the other end contacted to the pressing portion.

40. A method of controlling an optical disc device, the optical disc device including a main unit rotating a turntable when a disc is coupled to the turntable and including an optical pick-up unit writing/reading data to/from the disc, a lever member guiding the disc to load the disc to a position at which a center of the disc is aligned with a center of the turntable and reversely guiding the disc to unload the disc, the lever member being capable of loading/unloading discs having various diameters, a driving unit actuating the lever member, and a diameter detector detecting the diameter of the disc, the method comprising:
detecting a diameter of a disc inserted into the optical disc device using the diameter detector;
moving the lever member along a path which is dependent on the diameter of the disc so as to load the disc to a position at which a center of the disc is aligned with the center of the turntable;
coupling the disc to the turntable;
escaping the lever member from an edge of the disc to allow writing/reading data to/from the disc to be performed; and
writing/reading data to/from the disc.

* * * * *